United States Patent
Asano et al.

(10) Patent No.: US 8,721,774 B2
(45) Date of Patent: May 13, 2014

(54) GAS SEPARATION COMPOSITE MEMBRANE

(75) Inventors: Shushi Asano, Kurashiki (JP); Yoshiki Nobuto, Kurashiki (JP); Naoki Fujiwara, Kurashiki (JP); Shuhong Duan, Kizugawa (JP); Shingo Kazama, Kizugawa (JP)

(73) Assignee: Research Institute of Innovative Technology for the Earth, Kizugawa-shi (JP)

( * ) Notice: Subject to any disclaimer, the term of this patent is extended or adjusted under 35 U.S.C. 154(b) by 84 days.

(21) Appl. No.: 13/579,169

(22) PCT Filed: Feb. 15, 2011

(86) PCT No.: PCT/JP2011/053090
§ 371 (c)(1),
(2), (4) Date: Aug. 15, 2012

(87) PCT Pub. No.: WO2011/102326
PCT Pub. Date: Aug. 25, 2011

(65) Prior Publication Data
US 2012/0312168 A1  Dec. 13, 2012

(30) Foreign Application Priority Data

Feb. 16, 2010  (JP) ................... 2010-031394

(51) Int. Cl.
| B01D 53/22 | (2006.01) |
| B01D 71/06 | (2006.01) |
| B01D 71/38 | (2006.01) |
| B01D 71/56 | (2006.01) |
| B01D 71/60 | (2006.01) |
| C08L 29/04 | (2006.01) |

(52) U.S. Cl.
USPC ............... 96/12; 96/4; 95/45; 95/51

(58) Field of Classification Search
USPC .................... 96/4, 12; 95/45, 51
See application file for complete search history.

(56) References Cited

U.S. PATENT DOCUMENTS

| 5,445,669 A | 8/1995 | Nakabayashi et al. |
| 2003/0033932 A1* | 2/2003 | Sirkar et al. ............ 95/51 |
| 2008/0199619 A1* | 8/2008 | Ryu et al. ............. 427/340 |
| 2009/0217819 A1* | 9/2009 | Wessling et al. ........... 96/14 |
| 2010/0071557 A1* | 3/2010 | Seiler et al. ............. 96/12 |
| 2011/0174156 A1* | 7/2011 | Saunders et al. ........... 95/46 |
| 2013/0014642 A1* | 1/2013 | Sano .................. 96/12 |

FOREIGN PATENT DOCUMENTS

| JP | 7 112122 | 5/1995 | |
| JP | 2008-68238 | * 3/2008 | ............ B01D 71/60 |
| JP | 2008 68238 | 3/2008 | |
| JP | 2009 185118 | 8/2009 | |
| JP | 2009 241006 | 10/2009 | |
| JP | 2010 149026 | 7/2010 | |
| JP | 2010 155205 | 7/2010 | |

OTHER PUBLICATIONS

Kovvali, A.S., et al., "Dendrimer Membranes: A CO2-Selective Molecular Gate," Journal of Americal Chemical Society vol. 122, pp. 7594-7595, (Jul. 20, 2000).
Kovvali, A.S., et al., "Dendrimer Liquid Membranes: CO2 Separation from Gas Mixtures," Ind. Eng. Chem. Res., vol. 40, pp. 2502-2511, (Apr. 24, 2001).
International Search Report Issued Mar. 22, 2011 in PCT/JP11/53090 Filed Feb. 15, 2011.

* cited by examiner

*Primary Examiner* — Jason M Greene
(74) *Attorney, Agent, or Firm* — Oblon, Spivak, McClelland, Maier & Neustadt, L.L.P.

(57) ABSTRACT

Disclosed is a gas separation composite membrane comprising a polyamidoamine dendrimer (A) having a specific group, a vinyl alcohol-based polymer (B) containing 0.5 to 5 mol % of carboxyl groups, and a crosslinking agent (C) having an azetidinium group, wherein the mass ratio (A)/(C) of the polyamidoamine dendrimer (A) to the crosslinking agent (C) having an azetidinium group is 20/80 to 65/35, and the mass ratio (B)/(C) of the vinyl alcohol-based polymer (B) to the crosslinking agent (C) having an azetidinium group is 20/80 to 80/20. Thus, a gas separation composite membrane capable of separating a specific type of gas from a mixed gas containing water vapor is provided.

4 Claims, No Drawings

GAS SEPARATION COMPOSITE MEMBRANE

TECHNICAL FIELD

The present invention relates to a gas separation composite membrane capable of separating a specific type of gas from a mixed gas containing water vapor.

BACKGROUND ART

Separation technologies using separation membranes have recently been making remarkable progress. Such separation technologies include various examples, such as separation between liquid and solid, e.g., obtaining drinking water by separating impurities, and separation of gases, e.g., oxygen-enrichment by separating nitrogen from air. Particularly, in gas separation technologies, the establishment of technologies to separate carbon dioxide selectively from a mixed gas is desired earnestly from the viewpoint of efficient recovery of fossil resources or prevention of global warming and promoted actively.

However, since conventional polymer membranes can exhibit only insufficient carbon dioxide selectivity (the membrane permeability of carbon dioxide/the membrane permeability of other gases), carbon dioxide of a desired concentration has not been recovered successfully therewith. In order to obtain a separation membrane superior in carbon dioxide selectivity, the use of a material with high affinity to carbon dioxide has been proposed; for example, there has been proposed a separation membrane in which a microporous support has been impregnated with a polyamidoamine dendrimer that in the form of a liquid material at room temperature (non-patent documents 1 and 2). Although this impregnated membrane exhibits high carbon dioxide selectivity with a value of 1,000 or more under such a condition that no pressure difference is applied to the membrane, it is insufficient for practical use because of its low membrane flux due to no pressure difference. On the other hand, it has not been used practically also under the application of pressure because the polyamidoamine dendrimer flows out from the support with time under the application of pressure to become impossible to maintain its selectivity.

As a method for solving this problem, there has been proposed a composite membrane in which a layer of a hydrophilic macromolecular material crosslinked with a crosslinking agent as a matrix impregnated with a specific amine compound has been formed on the surface of a porous support membrane (patent document 1). This composite membrane is considered to be a separation membrane that not only is high in carbon dioxide selectivity but also can withstand a certain pressure difference. Where water vapor is contained in the mixed gas to be subjected to separation, however, there are required properties contrary to each other, i.e., a moderate hydrophilicity with which affinity is exhibited between the mixed gas and a membrane surface and water resistance with which the separation membrane exhibits no structural change under a water vapor atmosphere. The aforementioned composite membrane is difficult to be used for practical use because if a mixed gas is supplied under a water vapor atmosphere, then the contained amine compound flows out from the composite membrane with time and the composite membrane cannot maintain its carbon dioxide selectivity. Since the number of examples of inclusion of water vapor in a mixed gas is expected to increase greatly due to the establishment of coal gasification power plants, there has been desired earnestly the development of a separation membrane that has moderate hydrophilicity and water resistance and can be used practically even for a mixed gas containing water vapor.

PRIOR ART DOCUMENTS

Patent Document(s)

Patent document 1: JP 2008-68238 A

Non-Patent Document(s)

Non-patent document 1: J. Am. Chem. Soc. 122 (2000) 7594-7595

Non-patent document 2: Ind. Eng. Chem. Res. 40 (2001) 2502-2511

SUMMARY OF THE INVENTION

Problem to be Solved by the Invention

The present invention was devised in order to solve the above-described problems and aims to provide a gas separation composite membrane capable of separating a specific type of gas even if a mixed gas containing water vapor is applied.

Means for Solving the Problems

As a result of earnest investigations for solving the above-described problems, the present inventors accomplished the present invention by finding that there can be obtained a gas separation composite membrane capable of exhibiting high carbon dioxide selectivity even for a mixed gas containing water vapor and capable of being used practically, when a gas separation composite membrane comprises a vinyl alcohol-based copolymer modified in a specific amount with carboxyl groups, a polyamidoamine dendrimer, and a crosslinking agent having an azetidinium group, and a mass ratio (A)/(C) of the polyamidoamine dendrimer (A) to the crosslinking agent (C) having an azetidinium group and a mass ratio (B)/(C) of the vinyl alcohol-based polymer (B) to the crosslinking agent (C) having an azetidinium group fall within specific ranges.

That is, the aforementioned problems can be solved by providing a gas separation composite membrane comprising a polyamidoamine dendrimer (A) having a group represented by formula (1):

[chem. 1]

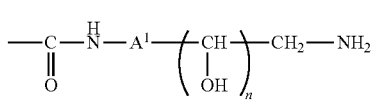

wherein $A^1$ represents a divalent organic residue having 1 to 3 carbon atoms and n represents an integer of 0 or 1, or a group represented by formula (2):

[chem. 2]

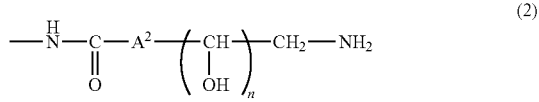

(2)

wherein A² represents a divalent organic residue having 1 to 3 carbon atoms and n represents an integer of 0 or 1, a vinyl alcohol-based polymer (B) containing 0.5 to 5 mold of carboxyl groups, and a crosslinking agent (C) having an azetidinium group, wherein the mass ratio (A)/(C) of the polyamidoamine dendrimer (A) to the crosslinking agent (C) having an azetidinium group is 20/80 to 65/35, and the mass ratio (B)/(C) of the vinyl alcohol-based polymer (B) to the crosslinking agent (C) having an azetidinium group is 20/80 to 80/20.

Preferably, the composite membrane exhibits a weight retention of the composite membrane of 60% by mass or more and a weight retention of nitrogen element of 60% by mass or more when the composite membrane has been immersed in distilled water of 30° C. for 3 hours.

An aforementioned problem can be solved also by providing a gas separation composite membrane comprising a polyamidoamine dendrimer (A) having a group represented by formula (1):

[chem. 3]

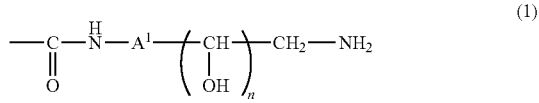

(1)

wherein A¹ represents a divalent organic residue having 1 to 3 carbon atoms and n represents an integer of 0 or 1, or a group represented by formula (2):

[chem. 4]

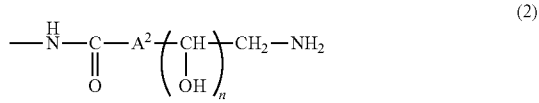

(2)

wherein A² represents a divalent organic residue having 1 to 3 carbon atoms and n represents an integer of 0 or 1, a vinyl alcohol-based polymer (B) containing 0.5 to 5 mol % of carboxyl groups, a crosslinking agent (C) having an azetidinium group, and a polyfunctional crosslinking agent (D), wherein the mass ratio (A)/(C) of the polyamidoamine dendrimer (A) to the crosslinking agent (C) having an azetidinium group is 20/80 to 65/35, the mass ratio (B)/(C) of the vinyl alcohol-based polymer (B) to the crosslinking agent (C) having an azetidinium group is 20/80 to 80/20, and the mass ratio (B)/(D) of the vinyl alcohol-based polymer (B) to the polyfunctional crosslinking agent (D) is 60/40 to 90/10.

Preferably, the composite membrane exhibits a weight retention of the composite membrane of 60% by mass or more and a weight retention of nitrogen element of 60% by mass or more when the composite membrane has been immersed in distilled water of 30° C. for 3 hours.

Effect of the Invention

The gas separation composite membrane of the present invention can separate a specific type of gas even from a mixed gas containing water vapor.

MODE FOR CARRYING OUT THE INVENTION

The gas separation composite membrane of the present invention contains a polyamidoamine dendrimer (A), a vinyl alcohol-based polymer (B) containing 0.5 to 5 mold of carboxyl groups, and a crosslinking agent (C) having an azetidinium group, wherein the mass ratio (A)/(C) of the polyamidoamine dendrimer (A) to the crosslinking agent (C) having an azetidinium group is 20/80 to 65/35, and the mass ratio (B)/(C) of the vinyl alcohol-based polymer (B) to the crosslinking agent (C) having an azetidinium group is 20/80 to 80/20. By the employment of such constitution, it is possible to obtain a gas separation composite membrane superior in performance to separate a specific type of gas selectively even from a mixed gas containing water vapor.

The polyamidoamine dendrimer (A) to be used for the present invention has a group represented by formula (1):

[chem. 5]

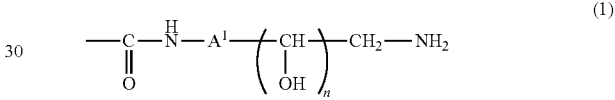

(1)

wherein A¹ represents a divalent organic residue having 1 to 3 carbon atoms and n represents an integer of 0 or 1, or a group represented by formula (2):

[chem. 6]

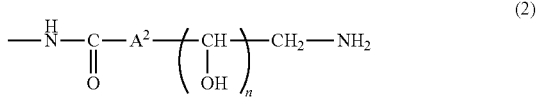

(2)

wherein A² represents a divalent organic residue having 1 to 3 carbon atoms and n represents an integer of 0 or 1. Of these, a polyamidoamine dendrimer (A) having a group represented by formula (1) is preferably used.

Examples of the divalent organic residue having 1 to 3 carbon atoms represented by A¹ and A² in formula (1) or formula (2) include linear or branched alkylene groups having 1 to 3 carbon atoms. Specific examples of such alkylene groups include —$CH_2$—, —$CH_2$—$CH_2$—, $CH_2$—$CH_2$—$CH_2$—, and —$CH_2$—$CH(CH_3)$—; among these, —$CH_2$— is particularly preferred. In formula (1) or formula (2), it is preferred n=1 because if so, the affinity with a mixed gas containing water vapor increases.

The polyamidoamine dendrimer (A) to be used for the present invention can be increased in the number of primary amines in its molecule by forming a branched structure by an amidation reaction using ethylenediamine to increase the number of branches. In the present invention, polyamidoamine dendrimers of any generation can be suitably used without any limitation with respect to the number of branches, and a polyamidoamine dendrimer of Generation 0 represented by formula (3), which has many primary amines per unit weight and with which the greatest adsorption ability of carbon dioxide can be expected is particularly suitably used.

[chem. 7]

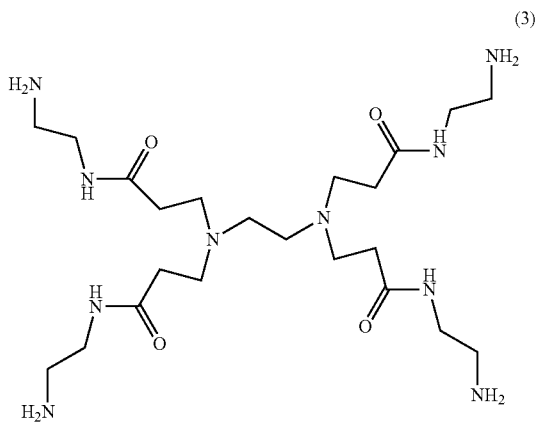

(3)

Next, description is made to a vinyl alcohol-based polymer (B). The vinyl alcohol-based polymer (B) to be used for the present invention contains 0.5 to 5 mol % of carboxyl groups. The vinyl alcohol-based polymer (B) to be used for the present invention contains 0.5 to 5 mol % of carboxyl groups, so that it combines with a crosslinking agent (C) having an azetidinium group to be crosslinked. The present inventors have presumed that the azetidinium group, which is a substructure of the crosslinking agent (C), reacts with a carboxyl group of the vinyl alcohol-based polymer (B) to be crosslinked.

Where the content of the carboxyl groups in the vinyl alcohol-based polymer (B) is less than 0.5 mold, the performance to separate a gas species of the gas separation composite membrane of the present invention tends to decrease with time and the water resistance of the membrane may deteriorate; where the content exceeds 5 mold, the stability of a solution of the vinyl alcohol-based polymer (B) deteriorates, so that a homogeneous composite membrane is hardly obtained and a desired composite membrane superior in water resistance may not be obtained. The content of carboxyl groups is preferably 0.75 to 4 mol %, particularly preferably 1 to 2 mol %.

The viscosity average degree of polymerization (this may hereinafter be referred to briefly as degree of polymerization) of the vinyl alcohol-based polymer (B) is 300 to 2500, more preferably 330 to 2200, particularly preferably 360 to 2000. The degree of polymerization (P) is measured in accordance with JIS-K6726. That is, it is calculated from the following formula from the intrinsic viscosity [η] measured in water of 30° C. after re-saponifying and refining the vinyl alcohol-based polymer (B).

$$P=([\eta]\times10^3/8.29)^{(1/0.62)}$$

Where the degree of polymerization is less than 300, a function to constitute the matrix of a composite membrane may decline, so that the water resistance of the composite membrane may deteriorate. Where the degree of polymerization exceeds 2500, the viscosity of a solution composed of the polyamidoamine dendrimer (A), the vinyl alcohol-based polymer (B), and the crosslinking agent (C) having an azetidinium group at the time of producing a composite membrane may become excessively high, so that the workability may lower and homogeneous composite membranes may not be obtained.

The degree of saponification of the vinyl alcohol-based polymer (B) to be used for the present invention is preferably 95 to 99.9 mol %. Where the degree of saponification is less than 95 mol %, there is a possibility that the water resistance of a composite membrane may deteriorate; where the degree of saponification exceeds 99.9 mol %, there is a possibility that workability in producing a membrane may lower or the viscosity stability of a solution consisting of the polyamidoamine dendrimer (A), the vinyl alcohol-based polymer (B), and the crosslinking agent (C) having an azetidinium group in the preparation of a composite membrane may deteriorate. The degree of saponification of the vinyl alcohol-based polymer (B) is more preferably 96 to 99 mol %.

The content of vinyl alcohol units in the vinyl alcohol-based polymer (B) to be used for the present invention is preferably 70 mol % or more, more preferably 80 mol % or more, and even more preferably 90 mol % or more. The vinyl alcohol-based polymer (B) to be used for the present invention may contain an ethylene unit. The content of ethylene units in the vinyl alcohol-based polymer (B) is preferably 0 to 15 mol %, particularly preferably 0 to 8 mol %. Where the content of ethylene units exceeds 15 mol %, there is not only a possibility that the amount of water absorption of a composite membrane may deteriorate, but also a possibility that no homogeneous composite membranes may be obtained due to decrease in compatibility with the polyamidoamine dendrimer (A).

The vinyl alcohol-based polymer (B) may contain monomer units other than vinyl alcohol units, vinyl ester units, ethylene units, and units containing each a carboxyl group unless the effect of the present invention is impaired. Examples of such monomer units include units derived from such monomers as acrylic esters, e.g., methyl acrylate, ethyl acrylate, n-propyl acrylate, and i-propyl acrylate; methacrylic acid and its salts; methacrylic esters, e.g., methyl methacrylate, ethyl methacrylate, n-propyl methacrylate, and i-propyl methacrylate; acrylamide; acrylamide derivatives, e.g., N-ethylacrylamide; methacrylamide; methacrylamide derivatives, e.g., N-methylmethacrylamide and N-ethylmethacrylamide; vinyl ethers, e.g., methyl vinyl ether, ethyl vinyl ether, n-propyl vinyl ether, and i-propyl vinyl ether; nitrile, e.g., acrylonitrile and methacrylonitrile; vinyl halides, e.g., vinyl chloride, vinylidene chloride, vinyl fluoride, and vinylidene fluoride; allyl compounds, e.g., allyl acetate and allyl chloride; vinylsilyl compounds, e.g., vinyltrimethoxysilane; and isopropenyl acetate. The content of such monomer units is preferably 10 mol % or less, more preferably 5 mol % or less, and even more preferably 3 mol % or less.

Next, description is made to a crosslinking agent (C) having an azetidinium group. The crosslinking agent (C) to be used for the present invention is used not only for crosslinking the vinyl alcohol-based polymer (B) but also for crosslinking the polyamidoamine dendrimer (A) and it is not particularly restricted if it is a compound having an azetidinium group in the molecule thereof. A compound having a substructure represented by the formula (4) described below is preferably used. From the viewpoint of water resistance or pressure resistance, a polyamide-epichlorohydrin resin is particularly preferably used as the crosslinking agent (C) having an azetidinium group.

As the crosslinking agent (C) having an azetidinium group, one having a substructure represented with the following formula (4) is preferably used:

[chem. 8]

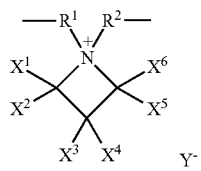
(4)

wherein $R^1$ and $R^2$ each independently are an alkylene group having 1 to 20 carbon atoms that may have a substituent, $X^1$, $X^2$, $X^3$, $X^4$, $X^5$, and $X^6$ each independently are a hydrogen atom, a hydroxy group, or an organic group having 1 to 20 carbon atoms that may have a substituent, and $Y^-$ is an anion.

In the formula (4), $R^3$ and $R^2$ each independently are an alkylene group having 1 to 20 carbon atoms that may have a substituent. Examples of the alkylene group having 1 to 20 carbon atoms include a methylene group, an ethylene group, a propylene group, a butylene group, a pentylene group, a hexylene group, and an octylene group.

In the above-mentioned formula (4), $X^1$, $X^2$, $X^3$, $X^4$, $X^5$, and $X^6$ each independently are a hydrogen atom, a hydroxy group, or an organic group having 1 to 20 carbon atoms that may have a substituent. Examples of the organic group having 1 to 20 carbon atoms that may have a substituent include alkyl groups having 1 to 20 carbon atoms that may have a substituent, alkenyl groups having 1 to 20 carbon atoms that may have a substituent, alkynyl groups having 1 to 20 carbon atoms that may have a substituent, aryl groups having 6 to 20 carbon atoms that may have a substituent, alkoxy groups having 1 to 20 carbon atoms that may have a substituent, and acyl groups having 2 to 20 carbon atoms that may have a substituent. As to a combination of $X^1$, $X^2$, $X^3$, $X^4$, $X^5$, and $X^6$ in the formula (4), it is preferred that $X^1$, $X^2$, $X^5$, and $X^6$ be at least one member selected from the group consisting of a hydrogen atom, a hydroxy group, and an organic group having 1 to 20 carbon atoms that may have a substituent, and $X^3$ and $X^4$ be at least one member from the group consisting of a hydrogen atom and a hydroxy group; it is more preferred that $X^1$, $X^2$, $X^5$, and $X^6$ be hydrogen atoms, and $X^3$ and $X^4$ are one member selected from the group consisting of a hydrogen atom and a hydroxy group; and it is even more preferred that $X^3$ or $X^4$ be hydroxy groups.

In the formula (4), $Y^-$ is an anion. Specific examples of $Y^-$ include halogen anions, such as $I^-$ ($I_3^-$), $Br^-$, and $Cl^-$, halogen acid anions, such as $ClO_4^-$, sulfuric acid anion represented by $SO_4^{2-}$, nitric acid anion represented by $NO_3^-$, and sulfonic acid anions, such as p-toluenesulfonic acid anion, naphthalene sulfonic acid anion, $CH_3SO_3^-$, and $CF_3SO_3^-$. Among these, halogen anions are preferably used.

In the present invention, by using the aforementioned crosslinking agent (C) having an azetidinium group, the crosslinking agent (C) having an azetidinium group bonds to both the polyamidoamine dendrimer (A) and the vinyl alcohol-based polymer (B), which are thereby crosslinked. That is, the present inventors have presumed that the azetidinium group, which is a substructure of the crosslinking agent (C), reacts with an amino group in the polyamidoamine dendrimer (A) to form crosslinkage and it also reacts with a carboxyl group in the vinyl alcohol-based polymer (B) to form crosslinkage. The crosslinking reaction using the crosslinking agent (C) having an azetidinium group is preferably carried out at 60 to 150° C.

In the present invention, the mass ratio (A)/(C) of the polyamidoamine dendrimer (A) to the crosslinking agent (C) having an azetidinium group is 20/80 to 65/35. Where the mass ratio (A)/(C) is less than 20/80, there is a possibility that a high carbon dioxide selectivity will not be obtained because of such an insufficient proportion of (A); on the other hand where the mass ratio (A)/(C) exceeds 65/35, the stability of the polyamidoamine dendrimer (A) in the gas separation composite membrane against a gas with pressure will decrease, so that a high carbon dioxide selectivity may not be obtained. The mass ratio (A)/(C) is preferably 35/65 to 65/35, more preferably 40/60 to 65/35.

The mass ratio (B)/(C) of the vinyl alcohol-based polymer (B) to the crosslinking agent (C) having an azetidinium group is 20/80 to 80/20. Where the mass ratio (B)/(C) is less than 20/80, a homogeneous gas separation composite membrane may not be obtained because of decrease in membrane formability; on the other hand, where the mass ratio (B)/(C) exceeds 80/20, water resistance may decrease. The mass ratio (B)/(C) is preferably 25/75 to 80/20.

Next, description is made to a polyfunctional crosslinking agent (D). The crosslinking agent (D) to be used for the present invention is a polyfunctional crosslinking agent having no azetidinium group. That is, the crosslinking agent (D) to be used for the present invention is a crosslinking agent to be used for crosslinking between vinylalcohol-based polymers (B) or between a polyamidoamine dendrimer (A) and a vinyl alcohol-based polymer (B), and examples thereof include, but are not restricted particularly to, compounds having two or more functional groups, such as an epoxy group, an aldehyde group, and halogen atoms, titanium-containing crosslinking agents, and zirconium-containing crosslinking agents. Among these, the polyfunctional crosslinking agent (D) is preferably at least one member from the group consisting of titanium-containing crosslinking agents, zirconium-containing crosslinking agents, and cross linking agents having an epoxy group or an aldehyde group as a functional group.

Examples of the crosslinking agents having an epoxy group include diglycidyl ether compounds such as epichlorohydrin, diepoxyalkanes, diepoxyalkenes, (poly)ethylene glycol diglycidyl ether, (poly)propylene glycol diglycidyl ether, and (poly)glycerin diglycidyl ether; especially, ethylene glycol diglycidyl ether is preferred. Examples of the crosslinking agents having an aldehyde group include dialdehyde compounds such as glutaraldehyde, succinaldehyde, malondialdehyde, terephthalaldehyde, and isophthalaldehyde; especially, glutaraldehyde is preferred. As the titanium-containing crosslinking agents, preferred are crosslinking agents based on titanium alkoxides, such as titanium diisopropoxybis(triethanolaminate) and titanium lactate ammonium salt. Examples of the zirconium-containing crosslinking agents include zirconium chloride, zirconium sulfate, zirconium nitrate, zirconium acetate, zirconium carbonate, zirconium carbonate ammonium, zirconium stearate, zirconium octylate, and zirconium silicate. Among such zirconium compounds, water-soluble compounds are preferred, and water-soluble compounds free of chlorine are more preferred. Specific examples include zirconium sulfate, zirconium nitrate, zirconium acetate, and zirconium ammonium carbonate.

The mass ratio (B)/(D) of the vinyl alcohol-based polymer (B) to the polyfunctional crosslinking agent (D) is not particularly limited and preferably is 60/40 to 90/10. Where the mass ratio (B)/(D) is less than 60/40, membrane formation will become difficult due to decrease in solution stability, so that a homogeneous gas separation composite membrane may not be obtained; on the other hand, where the mass ratio (B)/(D) exceeds 90/10, water resistance may decrease. The mass ratio (B)/(D) is preferably 65/35 to 85/15.

In the present invention, the weight retention of the composite membrane exhibited when the composite membrane has been immersed in distilled water of 30° C. for 3 hours is preferably within the range of from 60 to 100% by mass. Because of the fact that the weight retention is within this range, it is possible to advantageously obtain a gas separation composite membrane that has water resistance and is not suffered from decrease in carbon dioxide selectivity. The present inventors have confirmed that the weight retention of the gas separation composite membrane of the present invention is influenced by the crosslinking ratio between the polyamidoamine dendrimer (A) and the vinyl alcohol-based polymer (B) and the molecular weight thereof. The crosslinking ratio can be adjusted by the above-described mass ratio (A)/(C) of the polyamidoamine dendrimer (A) to the crosslinking agent (C) having an azetidinium group and can be adjusted also by adding a polyfunctional crosslinking agent (D). Moreover, it can be adjusted also by crosslinking conditions.

Where the gas separation composite membrane of the present invention has a weight retention less than 60% by mass, the polyamidoamine dendrimer (A) cannot be fixed in a matrix of the vinyl alcohol-based polymer (B) and the crosslinking agent (C), so that high carbon dioxide selectivity inherent in the polyamidoamine dendrimer (A) may not be exhibited and water resistance also may lower. The weight retention is more preferably 70% by mass or more.

In the present invention, the weight retention of nitrogen element of the composite membrane exhibited when the composite membrane has been immersed in distilled water of 30° C. for 3 hours is preferably within the range of from 60 to 100% by mass. Because of the fact that the weight retention of nitrogen element is within this range, it is possible to advantageously obtain the composite membrane with high carbon dioxide selectivity inherent in the polyamidoamine dendrimer (A). The present inventors have confirmed that the weight retention of nitrogen element of the gas separation composite membrane of the present invention is influenced by the crosslinking ratio between the polyamidoamine dendrimer (A) and the vinyl alcohol-based polymer (B) and the molecular weight thereof. The crosslinking ratio can be adjusted in the same manner as that described above for the weight retention.

Where the gas separation composite membrane of the present invention has a weight retention of nitrogen element less than 60% by mass, the polyamidoamine dendrimer (A) may not be fixed sufficiently in a matrix of the vinyl alcohol-based polymer (B) and the crosslinking agent (C), so that high gas selectivity inherent in the polyamidoamine dendrimer (A) may not be exhibited. The weight retention of nitrogen element is more preferably 70% by mass or more.

It is preferable with the gas separation composite membrane of the present invention that the weight retention of the composite membrane exhibited when the composite membrane has been immersed in distilled water of 30° C. for 3 hours be 60% by mass or more and the weight retention of nitrogen element be 60% mass or more; this makes it possible to obtain a gas separation composite membrane that exhibits high carbon dioxide selectivity even for a mixed gas containing water vapor and that is capable of being applied to practical use.

Where the weight retention of the composite membrane exhibited when the composite membrane has been immersed in distilled water of 30° C. for 3 hours is 60% by mass or more and the weight retention of nitrogen element is 60% mass or more in the gas separation composite membrane of the present invention as described above, the polyamidoamine dendrimer (A) and the vinyl alcohol-based polymer (B) containing 0.5 to 5 mol % of carboxyl groups are determined to have been crosslinked with the crosslinking agent (C) having an azetidinium group.

The weight retention of the composite membrane and the weight retention of nitrogen element in the gas separation composite membrane of the present invention can be brought into the aforementioned ranges by appropriate choice of the types and the ratios of the polyamidoamine dendrimer (A), the vinyl alcohol-based polymer (B), the crosslinking agent (C), and the polyfunctional crosslinking agent (D).

From the viewpoint of obtaining a gas separation composite membrane superior in water resistance, heat treatment of the composite membrane is important. By promoting the crystallization of the vinyl alcohol-based polymer (B) by heat treatment, it is possible to develop an effect similar to that of crosslinking. The heat treatment temperature is preferably 60 to 150° C., more preferably 90 to 130° C. Where the heat treatment temperature is lower than 60° C., the effect of the heat treatment may become insufficient; it is undesirable that the heat treatment temperature exceeds 150° C. because if so, the respective components may decompose. The time of the heat treatment, which is not particularly limited, is preferably within the range of from one second to one hour. Where the time is less than one second, the effect of the heat treatment may become insufficient; it is undesirable that the time exceeds one hour because if so, not only the respective components may decompose but also difficulties may arise in industrial practice.

The gas separation composite membrane superior in water resistance of the present invention is used suitably as a gas separation membrane that withstands a mixed gas containing water vapor and that is capable of being applied to practical use. A gas separation membrane is composed of a supporting membrane and the composite membrane of the present invention, and the composite membrane of the present invention is formed on the surface of a conventional supporting membrane. As the polymer to constitute the supporting membrane, conventional resins to be used for membrane formation can be used. Examples thereof include polysulfone, polyethersulfone, polyamide, polyimide, polyacrylonitrile, polystyrene, polyvinylidene fluoride, polyvinyl chloride, and polymethyl methacrylate.

EXAMPLES

The present invention is described in more detail below with reference to Examples, but the invention is not limited thereto. Unless otherwise stated in the Examples, "%" means "% by mass."

[Evaluation of the Water Resistance of Composite Membrane]

The weight retention, the swelling ratio, and the weight retention of nitrogen element of a sheet-like material were calculated from the following formulae. Values of nitrogen element weight were obtained by using an organic elemental analysis 2400II (manufactured by PerkinElmer, Inc.).

Weight retention (%)=($W2/W3$)×100

Swelling ratio (%)=($W1/W2$)×100

Weight retention of nitrogen element (%)=($N2/N3$)×100

W1: Sample weight after immersion in water, W2: Sample weight after immersion in water and subsequent drying, W3: Sample weight before immersion in water N2: Nitrogen weight in sample after immersion in water and subsequent drying, N3: Nitrogen weight in sample before immersion in water

[Method for Confirming Crosslinking of Composite Membrane]

The weight retention and the weight retention of nitrogen element exhibited when a sheet-like material had been immersed in distilled water of 30° C. for 3 hours were measured, and then the composite membrane was judged to have been crosslinked from the fact that both the measurements were 60% by mass or more.

[Methods for Measuring the Gas Permeability and the Carbon Dioxide Selectivity of Composite Membrane]

A carbon dioxide permeability $Q(CO_2)$ ($m^3/m^2 \cdot s \cdot Pa$) and a helium permeability $Q(He)$ ($m^3/m^2 \cdot s \cdot Pa$) were measured as follows, and then carbon dioxide selectivity $\alpha$ (–) was determined.

To a composite membrane was supplied gas of which the composition had been adjusted to $CO_2/He=80/20$ (ml/min), the temperature to 40° C., and the relative humidity to 80% RH. Then the gas permeated the membrane was sent to a gas chromatograph (Model No.: GC-4000, manufactured by GL Sciences Inc.) together with Ar flowing on the permeated side at a rate of 10 ml/min as a sweeping gas, and then the gas permeability of the composite membrane was measured from composition analysis. This measurement was carried out by the differential pressure method with a trans-membrane pressure difference adjusted to 0.4 MPa.

$Q(CO_2)$=($CO_2$ permeation flow rate)/(membrane area)·($CO_2$ supply partial pressure–$CO_2$ permeation partial pressure)

$Q(He)$=(He permeation flow rate)/(membrane area)·(He supply partial pressure–He permeation partial pressure)

$\alpha=Q(CO_2)/Q(He)$

Example 1

A 5% aqueous solution of PVA (brand name: KL-118, produced by Kuraray Co., Ltd.) containing 1 mol % of carboxyl groups and having a degree of saponification of vinyl acetate units of 98.6 mol % and a degree of polymerization of 1,800 was prepared, and to 100 parts by weight of the aqueous solution, 6.25 parts by weight of a 20% methanol aqueous solution of a polyamidoamine dendrimer (surface group: —$CONHCH_2CH_2NH_2$, the number of surface groups: 4) (produced by Aldrich) and 6 parts by weight of a 25% aqueous solution of a polyamide-epichlorohydrin resin (brand name: WS4020, produced by SEIKO PMC Corporation) were added gradually under stirring, so that preparation was conducted. The resulting solution was cast and then dried at 20° C., so that a 100-μm thick sheet-like material was obtained. The resulting sheet-like material was fixed to a frame and then subjected to heat treatment at 120° C. for 10 minutes in a hot air drier. The heat treated sheet-like material was immersed in distilled water of 30° C. for 3 hours, and then the weight retention, the swelling ratio, and the weight retention of nitrogen element thereof were measured. The weight retention, the swelling ratio, and the weight retention of nitrogen element were 90%, 340% and 93%, respectively, and the material had a tough membrane condition. Using a gas separation composite membrane made of the resulting sheet-like material, a permeability of carbon dioxide $Q(CO_2)$ and a permeability of helium $Q(He)$ were measured, and then a carbon dioxide selectivity $\alpha$ (–) was determined. The results are shown in Table 1.

Example 2

A 5% aqueous solution of PVA (brand name: KL-118, produced by Kuraray Co., Ltd.), which was the same as that of Example 1, was prepared, and to 100 parts by weight of the aqueous solution, 62.5 parts by weight of a 20% methanol aqueous solution of a polyamidoamine dendrimer (surface group: —$CONHCH_2CH_2NH_2$, the number of surface groups: 4) (produced by Aldrich) and 30 parts by weight of a 25% aqueous solution of a polyamide-epichlorohydrin resin (brand name: WS4020, produced by SEIKO PMC Corporation) were added gradually under stirring, so that preparation was conducted. The resulting solution was cast and then dried at 20° C., so that a 100-μm thick sheet-like material was obtained. The resulting sheet-like material was fixed to a frame and then subjected to heat treatment at 120° C. for 10 minutes in a hot air drier. The heat treated sheet-like material was immersed in distilled water of 30° C. for 3 hours, and then the weight retention, the swelling ratio, and the weight retention of nitrogen element thereof were measured. The weight retention, the swelling ratio, and the weight retention of nitrogen element were 76%, 410% and 91%, respectively, and the material had a tough membrane condition. Using a gas separation composite membrane made of the resulting sheet-like material, a permeability of carbon dioxide $Q(CO_2)$ and a permeability of helium $Q(He)$ were measured, and then a carbon dioxide selectivity $\alpha$ (–) was determined. The results are shown in Table 1.

Example 3

A 5% aqueous solution of PVA (brand name: KL-118, produced by Kuraray Co., Ltd.), which was the same as that of Example 1, was prepared, and to 100 parts by weight of the aqueous solution, 62.5 parts by weight of a 20% methanol aqueous solution of a polyamidoamine dendrimer (surface group: —$CONHCH_2CH_2NH_2$, the number of surface groups: 4) (produced by Aldrich), 30 parts by weight of a 25% aqueous solution of a polyamide-epichlorohydrin resin (brand name: WS4020, produced by SEIKO PMC Corporation), and 1.5625 parts by weight of a 80% solution of ORGATIX TC400 (produced by Matsumoto Fine Chemical Co., Ltd.) were added gradually under stirring, so that preparation was conducted. The resulting solution was cast and then dried at 20° C., so that a 100-μm thick sheet-like material was obtained. The resulting sheet-like material was fixed to a frame and then subjected to heat treatment at 120° C. for 10 minutes in a hot air drier. The heat treated sheet-like material was immersed in distilled water of 30° C. for 3 hours, and then the weight retention, the swelling ratio, and the weight retention of nitrogen element thereof were measured. The weight retention, the swelling ratio, and the weight retention of nitrogen element were 83%, 170% and 91%, respectively, and the material had a tough membrane condition. Using a gas separation composite membrane made of the resulting sheet-like material, a permeability of carbon dioxide $Q(CO_2)$ and a permeability of helium $Q(He)$ were measured, and then a carbon dioxide selectivity $\alpha$ (–) was determined. Results are shown in Table 1.

Comparative Example 1

A sheet-like material was prepared in the same manner as Example 1 except that the preparation was conducted using 1.5625 parts by weight of a 80% solution of ORGATIX TC400 instead of the polyamide-epichlorohydrin resin. The weight retention and the swelling ratio were 83% and 160%, respectively, and the material had a tough membrane condition, but the weight retention of nitrogen element was as low as 5% and therefore it was confirmed that most of the polyamidoamine dendrimer had eluted. Using the resulting sheet-like material, a permeability of carbon dioxide Q(CO$_2$) and a permeability of helium Q(He) were measured, and then a carbon dioxide selectivity α (–) was determined. The results are shown in Table 1.

Comparative Example 2

A sheet-like material was prepared in the same manner as Example 1 except for altering the type of PVA to a PVA (brand name: PVA-120, produced by Kuraray Co., Ltd.) having a degree of saponification of vinyl acetate units of 98.6 mol % and a degree of polymerization of 2,000 and not having been modified with carboxyl groups. The resulting sheet-like material was not able to maintain its membrane form in distilled water and the membrane itself dissolved. Moreover, since the resulting sheet-like material did not become a homogeneous membrane due to the occurrence of phase separation, a permeability of carbon dioxide Q(CO$_2$) and a permeability of helium Q(He) could not be measured, so that a carbon dioxide selectivity α (–) could not be determined. Results are shown in Table 1.

Comparative Example 3

A sheet-like material was prepared in the same manner as Example 1 except for altering the amount of the polyamidoamine dendrimer as shown in Table 1. The weight retention, the swelling ratio, and the weight retention of nitrogen element were 45%, 1,440%, and 16%, respectively, the material had a defective membrane condition and it was confirmed that most of the polyamidoamine dendrimer had eluted. Using the resulting sheet-like material, a permeability of carbon dioxide Q(CO$_2$) and a permeability of helium Q(He) were measured, and then a carbon dioxide selectivity α (–) was determined. Results are shown in Table 1.

Comparative Example 4

A sheet-like material was prepared in the same manner as Example 3 except for altering the amount of the polyamide-epichlorohydrin resin as shown in Table 1. The weight retention and the swelling ratio were 51% and 560%, respectively, and the material had a tough membrane condition, but the weight retention of nitrogen element was as low as 16% and therefore it was confirmed that most of the polyamidoamine dendrimer had eluted. Using the resulting sheet-like material, a permeability of carbon dioxide Q(CO$_2$) and a permeability of helium Q(He) were measured, and then a carbon dioxide selectivity α (–) was determined. Results are shown in Table 1.

TABLE 1

| | Polyamidoamine dendrimer (A) | Vinyl alcohol-based polymer (B) | Polyamide-epichlorohydrin resin (C) | Titanium-containing crosslinking agent (D) | Weight fraction [part(s) by weight] | | | |
|---|---|---|---|---|---|---|---|---|
| | | | | | (A) | (B) | (C) | (D) |
| Example 1 | PAMAM | KL-118 | WS4020 | — | 25 | 100 | 30 | 0 |
| Example 2 | PAMAM | KL-118 | WS4020 | — | 250 | 100 | 150 | 0 |
| Example 3 | PAMAM | KL-118 | WS4020 | TC400 | 250 | 100 | 150 | 25 |
| Comparative Example 1 | PAMAM | KL-118 | — | TC400 | 25 | 100 | 0 | 25 |
| Comparative Example 2 | PAMAM | PVA-120 | WS4020 | — | 25 | 100 | 30 | 0 |
| Comparative Example 3 | PAMAM | KL-118 | WS4020 | — | 250 | 100 | 30 | 0 |
| Comparative Example 4 | PAMAM | KL-118 | WS4020 | TC400 | 250 | 100 | 30 | 25 |

| | Results of water resistance evaluation | | | Results of gas permeability measurement | | |
|---|---|---|---|---|---|---|
| | Weight retention [% by mass] | Swelling ratio [% by mass] | Weight retention of nitrogen element [% by mass] | Carbon dioxide permeability Q (CO2) [m$^3$/(m$^2$ · s · Pa)] | Helium permeability Q (He) [m$^3$/(m$^2$ · s · Pa)] | Separation factor α [—] |
| Example 1 | 90 | 340 | 93 | $4.25 \times 10^{-12}$ | $2.83 \times 10^{-13}$ | 15.0 |
| Example 2 | 76 | 410 | 91 | $5.04 \times 10^{-12}$ | $1.90 \times 10^{-13}$ | 26.5 |
| Example 3 | 83 | 170 | 91 | $4.92 \times 10^{-12}$ | $1.91 \times 10^{-13}$ | 25.8 |
| Comparative Example 1 | 83 | 160 | 5 | $4.42 \times 10^{-12}$ | $1.77 \times 10^{-12}$ | 2.50 |
| Comparative Example 2 | dissolved | dissolved | dissolved | No homogeneous membrane was obtained due to the occurrence of phase separation. | No homogeneous membrane was obtained due to the occurrence of phase separation. | No homogeneous membrane was obtained due to the occurrence of phase separation. |
| Comparative Example 3 | 45 | 1440 | 16 | $3.35 \times 10^{-12}$ | $1.89 \times 10^{-13}$ | 17.7 |
| Comparative Example 4 | 51 | 560 | 16 | $3.30 \times 10^{-12}$ | $1.80 \times 10^{-13}$ | 18.9 |

PAMAM: Polyamidoamine dendrimer of Generation 0
WS4020: Polyamide-epichlorohydrin resin having an azetidinium group, produced by SEIKO PMC Corporation
TC400: Titanium-containing crosslinking agent for PVA (ORGATIX TC400) produced by Matsumoto Fine Chemical Co., Ltd.
PVA-120: Degree of polymerization = 2,000, degree of saponification = 98.6 mol %, produced by Kuraray Co., Ltd.
KL-118: Degree of polymerization = 1,800, degree of saponification = 98.6 mol %, modification ratio with carboxyl groups = 1 mol %, produced by Kuraray Co., Ltd.

The invention claimed is:

1. A gas separation composite membrane comprising a polyamidoamine dendrimer (A) having a group represented by formula (1):

[Chemical Formula 1]

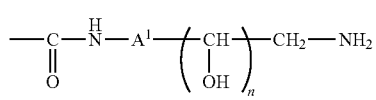
(1)

wherein $A^1$ represents a divalent organic residue having 1 to 3 carbon atoms and n represents an integer of 0 or 1, or a group represented by formula (2):

[Chemical Formula 2]

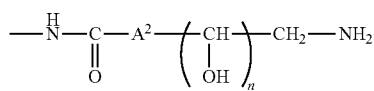
(2)

wherein $A^2$ represents a divalent organic residue having 1 to 3 carbon atoms and n represents an integer of 0 or 1,
a vinyl alcohol-based polymer (B) containing 0.5 to 5 mol % of carboxyl groups, and
a crosslinking agent (C) having an azetidinium group, wherein
the mass ratio (A)/(C) of the polyamidoamine dendrimer (A) to the crosslinking agent (C) having an azetidinium group is 20/80 to 65/35, and the mass ratio (B)/(C) of the vinyl alcohol-based polymer (B) to the crosslinking agent (C) having an azetidinium group is 20/80 to 80/20.

2. The gas separation composite membrane according to claim 1, wherein the composite membrane exhibits a weight retention of the composite membrane of 60% by mass or more and a weight retention of nitrogen element of 60% by mass or more when the composite membrane has been immersed in distilled water of 30° C. for 3 hours.

3. A gas separation composite membrane comprising a polyamidoamine dendrimer (A) having a group represented by formula (1):

[Chemical Formula 3]

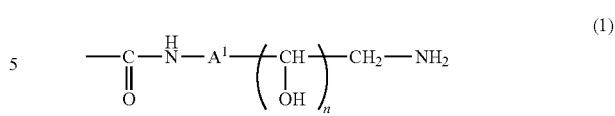
(1)

wherein $A^1$ represents a divalent organic residue having 1 to 3 carbon atoms and n represents an integer of 0 or 1, or a group represented by formula (2):

[Chemical Formula 4]

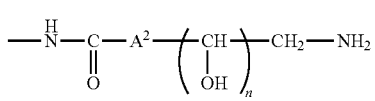
(2)

wherein $A^2$ represents a divalent organic residue having 1 to 3 carbon atoms and n represents an integer of 0 or 1,
a vinyl alcohol-based polymer (B) containing 0.5 to 5 mol % of carboxyl groups,
a crosslinking agent (C) having an azetidinium group, and
a polyfunctional crosslinking agent (D), wherein
the mass ratio (A)/(C) of the polyamidoamine dendrimer (A) to the crosslinking agent (C) having an azetidinium group is 20/80 to 65/35, the mass ratio (B)/(C) of the vinyl alcohol-based polymer (B) to the crosslinking agent (C) having an azetidinium group is 20/80 to 80/20, and the mass ratio (B)/(D) of the vinyl alcohol-based polymer (B) to the polyfunctional crosslinking agent (D) is 60/40 to 90/10.

4. The gas separation composite membrane according to claim 3, wherein the composite membrane exhibits a weight retention of the composite membrane of 60% by mass or more and a weight retention of nitrogen element of 60% by mass or more when the composite membrane has been immersed in distilled water of 30° C. for 3 hours.

* * * * *